Nov. 24, 1959 R. G. FRIED 2,913,903
SWIMMING POOL TEMPERATURE INDICATOR
Filed Oct. 30, 1957
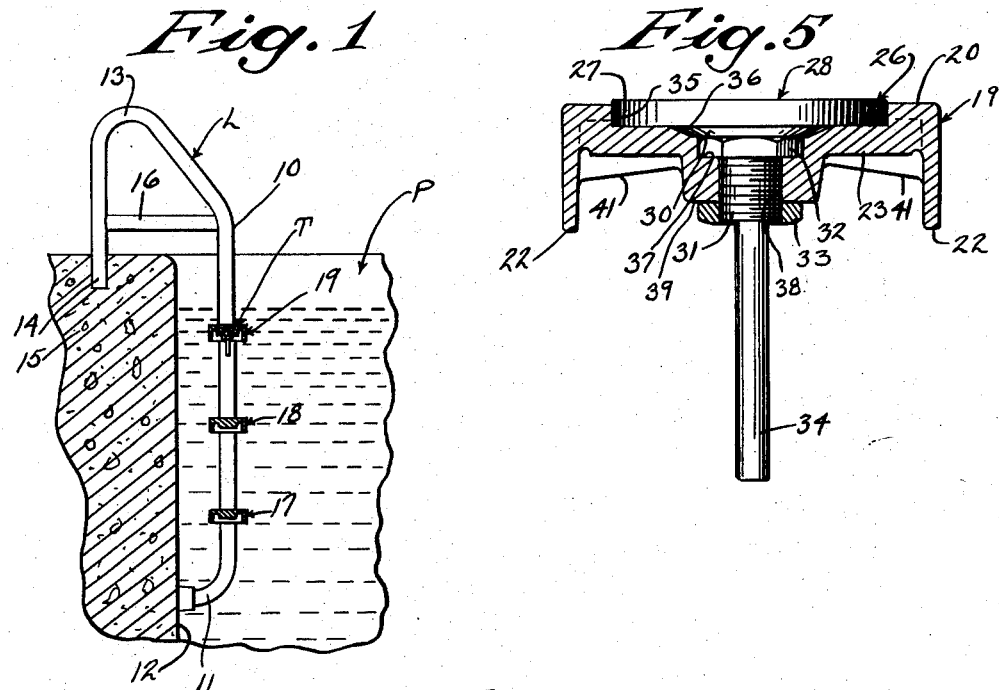
INVENTOR
RICHARD G. FRIED
BY
*Young and Wright*
ATTORNEYS

United States Patent Office 2,913,903
Patented Nov. 24, 1959

2,913,903

SWIMMING POOL TEMPERATURE INDICATOR

Richard G. Fried, Milwaukee, Wis.

Application October 30, 1957, Serial No. 693,382

4 Claims. (Cl. 73—343)

This invention appertains to swimming pool structure and, more particlularly to a novel means of mounting a thermometer so the temperature of the water can be readily and easily ascertained.

In utilizing swimming pools, either private or public, it is obviously advantageous to know the exact temperature of the water in relationship to the air and the usual method of obtaining the water temperature is by lowering a thermometer or some type of temperature gauging device into the water for a certain length of time and then pulling the device out of the water and reading the temperature. Obviously, this manner is far from satisfactory in that the temperature testing device must continually be removed from the water in order to be read.

It is, therefore, an object of my present invention to provide a novel means for mounting a temperature indicating device in a swimming pool in such a manner that it can be easily read at all times and still remain below the water level.

Another important object of my present invention is to provide a novel mounting for a temperature indicating device, which mounting is also utilized as one of the steps in the pool ladder.

Still another object of my present invention is to recess the upper surface of said step to receive the temperature reading face or dial so that the same is flush with the step and, therefore, will not cause injury either to the mechanism or to persons utilizing the step.

A further object of my present invention is to strengthen the under portion of the step in which the temperature recording mechanism is mounted by providing reinforcing ribs thereon.

A still further object of my present invention is to provide a novel means for removably securing the temperature reading device in the step whereby the face or dial of the temperature reading device will be just below the surface of the water where it can be easily read with the temperature sampling mechanism extending considerably below the indicating face.

A salient feature of my present invention resides in the fact that the temperature responsive mechanism depends below the horizontal dial face and is completely shielded and guarded by the dial and the step structure. Thus, preventing damage to the temperature sensitive mechanism and aids in giving a true reading of the water temperature.

Still another object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which drawing, Figure 1 is a fragmentary side elevational view partly in section, illustrating a preferred manner for positioning the temperature indicating device;

Figure 2 is a top plan view illustrating one means of mounting the temperature indicating device in its support such as the top step of the ladder so that the reading face or dial may be quickly and easily viewed;

Figure 3 is a bottom plan view showing the specific construction and manner of reinforcing the particular step or support in which the temperature reading device is mounted;

Figure 4 is an enlarged longitudinal section through the step or mounting means for the temperature indicating mechanism taken on the line 4—4 of Figure 3 and looking in the direction of the arrows, and Figure 5 is a transverse section on the same scale as Figure 4 taken on the line 5—5 of Figure 4 and looking in the direction of the arrows.

Referring now to the drawing in detail wherein similar reference characters designate corresponding parts throughout the several views, the letter T generally indicates the temperature indicating device and the same is associated with a pool P and in particular the ladder L thereof. The pool P and the ladder L form no particular part of the present invention and may be of any standard construction and the pool P may be made of concrete or any water-proof material.

In the present invention, however, the ladder L comprises identical side rails 10 turned inwardly at the bottom 11 to brace against the wall 12 of the pool P. The upper portion 13 of each rail is bent in the form of a hand guard or rail and the end 14 extends downwardly and is imbedded in the concrete or the like 15. If desired, each hand rail may be braced by providing a cross bar 16, as shown.

Extending between the side rails 10 is a series of steps 17, 18 and 19. These steps may be provided in any desired number and may be of any desired structure and formed from a number of different materials. However, for the purposes of illustration, the steps are either cast or stamped from metal to provide a top tread plate or surface 20 having an under surface 21 and a dependent peripheral flange 22 completely surrounding the step. The plate 20 is preferably thickened at the center thereof as indicated by the numeral 23 and, if desired, the step may be provided with a series of elongated apertures 24.

The temperature indicating device which is preferably associated with the top step 19 and the temperature responsive element (not shown), which moves the indicating needle 25, may be of any well known structure but the outer casing thereof is particularly adapted to be inserted in the center portion 23 of the step and for this purpose, the casing 26 includes an upper horizontally extending circular housing 27, the top wall 28 of which is transparent but water-proof to contain the dial 29 and the needle 25. This dial is graduated to indicate the degree of temperature of the water and may be graduated in any desired manner and to indicate either centigrade or Fahrenheit. The back or lower wall 30 of the circular casing has secured thereto an outwardly projecting externally threaded shank 31 and a pair of nuts 32 and 33, respectively, are adapted to be threaded on the shank 31. One nut 32 is threaded so as to be directly adjacent the back wall 30. Extending axially through the shank 31 is a depending tube 34 which houses the temperature responsive element (not shown).

The support or step 19 into which the temperature responsive element is secured is also specifically adapted to receive this element and for this purpose, the central upper tread surface 23 thereof is counter-sunk or recessed at 35 to receive the circular housing 27 so that the same will lie substantially flush with the entire upper tread surface 23 of the step 19 and the lower surface of this circular counter-sunk portion 35 is dished centrally at 36 and further counter-sunk at 37 to receive the upper nut 32.

Extending centrally from the recess 37 and entirely through the center portion 23 of the step 19 is a reduced bore portion 38 and this bore portion may be smooth or threaded, as desired, and the shank 31 extends through the bore 38 and is of sufficient length to extend considerably beyond the lower wall 39 of this center portion 23 so that the nut 33 may be threaded thereon to securely position the temperature indicating device to its support.

In order to lend strength and rigidity to the support or step 19, I also provide a pair of longitudinally extending strengthening webs 40 and transverse strengthening webs 41 joining the center portion 23 adjacent the bore 38. Obviously, the support 19 as well as the steps 17 and 18 can be secured to the side rails 10 by any well-known manner such as by merely providing set screws or the like 42, which tighten against the side rails 10.

Thus it can be seen that the novel structure of my temperature indicating device and its support or step 19 will protect the temperature sensitive mechanism in the depending tube 34 from damage and so locates this tube to provide a true reading of the water temperature without interference from the reflected sun rays and the like.

From the foregoing, it is believed that the features and advantages of my invention will be readily apparent to those skilled in the art and it will, of course, be understood that changes in the form, proportion and minor details of construction may be resorted to without departing from the spirit or the scope of the appended claims.

I claim:

1. A temperature indicating device adapted to be associated with a swimming pool ladder in such a manner as to be visible from above water level comprising, a horizontal support having a flat upper surface, an indicating dial carried by said support, the face of said dial being positioned substantially flush with said horizontal support in an upwardly facing attitude, and a depending temperature sensitive mechanism operatively connected to said indicating dial.

2. A temperature indicating device adapted to be associated with a swimming pool ladder in such a manner as to be visible from above water level comprising, a horizontal support connected transversely to said ladder and having a flat upper surface, and indicating dial carried by said support, said indicating dial having a flat horizontal viewing face recessed within and lying substantially flush with said horizontal support upper surface, and a temperature sensitive mechanism carried by said support and operatively connected to said indicating dial adjacent the under surface of said dial viewing face.

3. A temperature indicating device adapted to be associated with a swimming pool ladder in such a manner as to be visible from above water level comprising, a horizontal support connected transversely to said ladder and having a flat upper tread surface, an indicating dial carried centrally by said support the face of said dial being positioned substantially flush with said flat upper tread surface of said support, a depending temperature sensitive mechanism operatively connected to said indicating dial, and means for securing said indicating dial and temperature sensitive mechanism to said support.

4. A temperature indicating device adapted to be associated with a swimming pool ladder in such a manner as to be visible from above water level comprising, a horizontal support connected transversely to said ladder and having a flat upper tread surface, said horizontal support having a central thickened portion and a bore extending vertically therethrough, an indicating dial carried by said support and positioned in said bore, a depending temperature sensitive mechanism operatively connected to said indicating dial and extending below said thickened portion, and strengthening webs on the under surface of said horizontal support extending transversely and longitudinally of said support and terminating adjacent said central thickened portion.

References Cited in the file of this patent

UNITED STATES PATENTS

| | | |
|---|---|---|
| 1,274,512 | Chadwick | Aug. 6, 1918 |
| 2,019,221 | Hastings | Oct. 29, 1935 |
| 2,276,179 | Ford | Mar. 10, 1942 |
| 2,817,968 | Schmitz | Dec. 31, 1957 |